United States Patent
Pai-Paranjape et al.

(10) Patent No.: US 11,427,722 B2
(45) Date of Patent: *Aug. 30, 2022

(54) CRYSTALLINE POLYCARBONATE POWDERS FOR POWDER BED FUSION IN ADDITIVE MANUFACTURING

(71) Applicant: SHPP GLOBAL TECHNOLOGIES B.V., Bergen op Zoom (NL)

(72) Inventors: Vandita Pai-Paranjape, Evansville, IN (US); Elena Miloskovska, Breda (NL); Bruke Jofore, Bergen op Zoom (NL); Raul Fernandez Cabello, Bergen op Zoom (NL); Hao Gu, Bergen op Zoom (NL)

(73) Assignee: SHPP GLOBAL TECHNOLOGIES B.V., Bergen op Zoom (NL)

(*) Notice: Subject to any disclaimer, the term of this patent is extended or adjusted under 35 U.S.C. 154(b) by 0 days.

This patent is subject to a terminal disclaimer.

(21) Appl. No.: 17/537,680

(22) Filed: Nov. 30, 2021

(65) Prior Publication Data

US 2022/0081578 A1   Mar. 17, 2022

Related U.S. Application Data

(62) Division of application No. 16/341,310, filed as application No. PCT/US2017/056194 on Oct. 11, 2017, now Pat. No. 11,230,646.

(Continued)

(51) Int. Cl.
  *C09D 11/102* (2014.01)
  *B29C 64/153* (2017.01)
  (Continued)

(52) U.S. Cl.
  CPC .......... *C09D 11/102* (2013.01); *B29C 64/153* (2017.08); *B33Y 10/00* (2014.12);
  (Continued)

(58) Field of Classification Search
  CPC ....... C09D 11/102; B33Y 10/00; B33Y 70/00; B29C 64/153
  See application file for complete search history.

(56) References Cited

U.S. PATENT DOCUMENTS

| 8,709,330 B2 | 4/2014 | Huskamp et al. |
| 2004/0175686 A1 | 9/2004 | Ono et al. |

(Continued)

OTHER PUBLICATIONS

International Search Report for International Application No. PCT/US2017/056194, International Filing Date Oct. 11, 2017, dated Jan. 17, 2018, 4 pages.

(Continued)

*Primary Examiner* — Joseph S Del Sole
*Assistant Examiner* — John Robitaille
(74) *Attorney, Agent, or Firm* — Cantor Colburn LLP

(57) ABSTRACT

Provided are compositions including a population of particulates that comprise an at least partially crystalline polycarbonate having an average cross-sectional dimension of from about 1 to about 200 μm, and have a weight-average molecular weight, per polystyrene standards, of from about 17,000 to about 40,000 Daltons. The composition exhibits a zero-shear viscosity of less than about $10^4$ Pa·s at the melting temperature of the partially crystalline polycarbonate. Related systems and methods for utilizing these compositions in additive manufacturing applications, including selective laser sintering (SLS) applications, are also disclosed. Also provided are additively-manufactured articles made with the disclosed compositions and according to the disclosed methods.

18 Claims, 5 Drawing Sheets

Related U.S. Application Data

(60) Provisional application No. 62/406,479, filed on Oct. 11, 2016.

(51) Int. Cl.
| | |
|---|---|
| *B29K 69/00* | (2006.01) |
| *B33Y 10/00* | (2015.01) |
| *B33Y 70/00* | (2020.01) |
| *B33Y 30/00* | (2015.01) |
| *B33Y 80/00* | (2015.01) |

(52) U.S. Cl.
CPC .......... *B33Y 70/00* (2014.12); *B29K 2069/00* (2013.01); *B33Y 30/00* (2014.12); *B33Y 80/00* (2014.12)

(56) References Cited

U.S. PATENT DOCUMENTS

| | | |
|---|---|---|
| 2018/0178413 A1 | 6/2018 | Kalyanaraman et al. |
| 2018/0273699 A1 | 9/2018 | Kalyanaraman |

OTHER PUBLICATIONS

Wang Yan et al., "Selective Laser Sintering Molding of Polycarbonate Powders", Engineering Plastics Application, vol. 34, No. 12, Dec. 31, 2006; pp. 34-36, English abstract on p. 3.

Watkins et al., "Determination of interfacial tensions between BPA polycarbonate and styrene-acrylonitrile copolymers from capillary thread instability measurements", Polymer, vol. 34, No. 18, (1993), pp. 3955-3959.

Written Opinion for International Application No. PCT/US2017/056194, International Filing Date Oct. 11, 2017, dated Jan. 17, 2018, 5 pages.

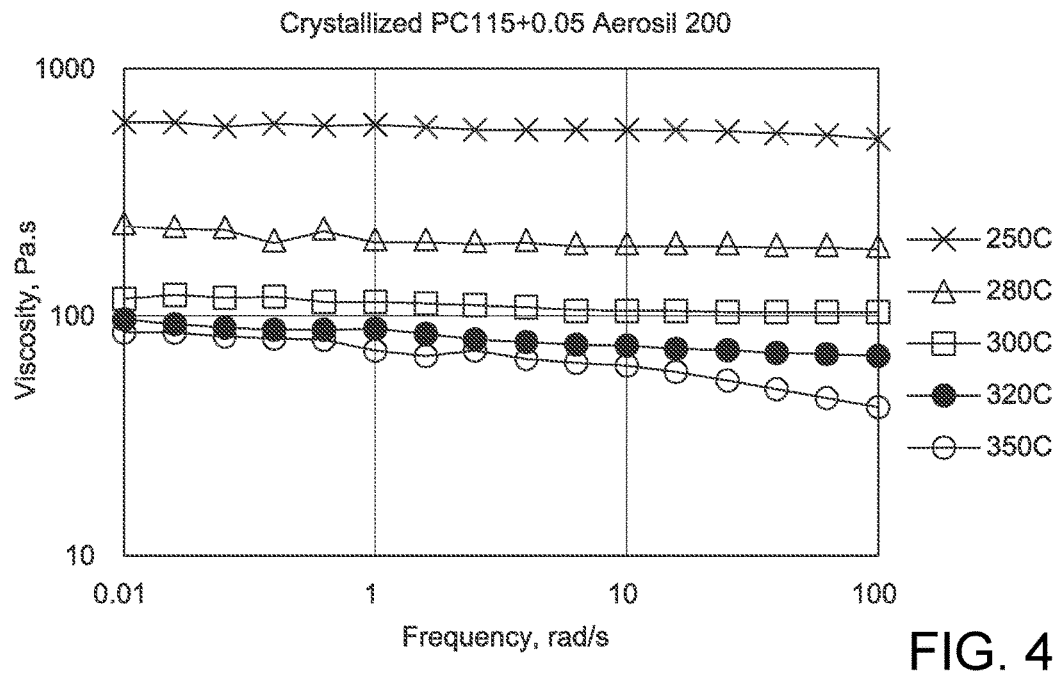

FIG. 4

| Properties | | Units | PA 12 Duraform, SLS | PA 12 standard, IM | Crystalline PC 115 | PC 115 IM |
|---|---|---|---|---|---|---|
| Density | X,Y direction | g/cm³ | 1.01 (99%) | 1.02 | 1.16 (97%) | 1.19 |
| | Z direction | | 1.00 (98%) | | 1.16 (97%) | |
| Tensile Strength | X,Y direction | MPa | 49 (123%) | 40 | 32 (52%) | 62 |
| | Z direction | | 10 (25%) | | 20 (32%) | |
| Tensile Modulus | X,Y direction | MPa | 1770 (111%) | 1600 | 1910 (84%) | 2261 |
| | Z direction | | 1550 (97%) | | 1782 (79%) | |
| Elongation at Break | X,Y direction | % | 32 (16%) | 200 | 5.9 (28%) | 21 |
| | Z direction | | 14 (7%) | | 3.6 (17%) | |
| Flexural Strength | X,Y direction | MPa | 48 (123%) | 40 | 53 (56%) | 94 |
| | Z direction | | 10 (25%) | | 43 (46%) | |
| Flexural Modulus | X,Y direction | MPa | 1684 (98%) | 1720 | 1830 (79%) | 2310 |
| | Z direction | | 1633 (95%) | | 1722 (75%) | |
| Charpy Impact Notched, 23C | X,Y direction | KJ/M² | 4.24 (106%) | 4 | 5.34 (49%) | 11 |
| | Z direction | | 2.15 (54%) | | 3.1 (28%) | |
| Thermal properties Vicat Softening Temp | | °C | 95 | 78 | 142 (100%) | 142 |

Table 1: Mechanical properties of PA12 and PC (IM = injection-molded) SLS-made parts

FIG. 5

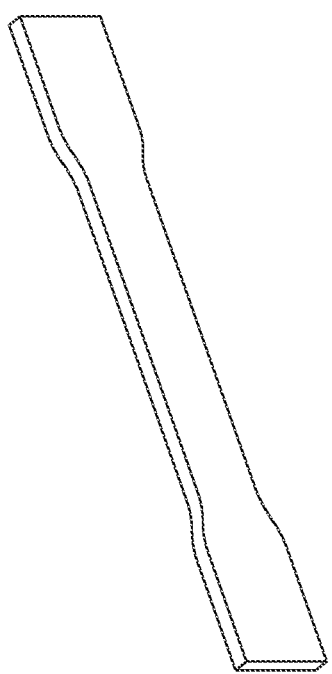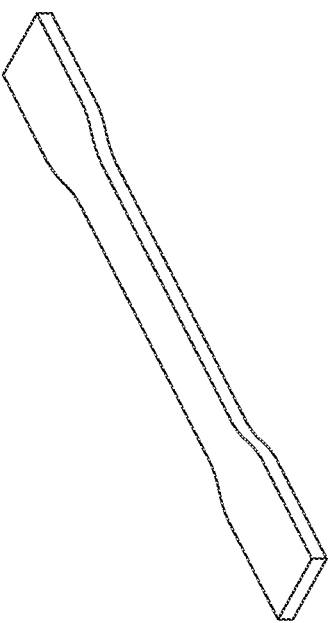
FIG. 6

CRYSTALLINE POLYCARBONATE POWDERS FOR POWDER BED FUSION IN ADDITIVE MANUFACTURING

CROSS REFERENCE TO RELATED APPLICATIONS

This application is a divisional application of U.S. application Ser. No. 16/341,310, filed Apr. 11, 2019, which is a National Stage application of PCT/US2017/056194, filed Oct. 11, 2017, which claims the benefit of U.S. Application No. 62/406,479, filed Oct. 11, 2016, each of which are incorporated by reference in their entirety herein.

TECHNICAL FIELD

The present disclosure relates to the field of additive manufacturing and to the field of polycarbonate materials.

BACKGROUND

Although some have sought to use amorphous polycarbonate (PC) in additive manufacturing processes, these attempts to obtain high-density additive-manufactured parts with amorphous PC have been unsuccessful. Melting the amorphous PC to give rise to high-density parts requires relatively high temperatures, and these high temperatures frequently result in the loss of dimensional stability in the final parts. Accordingly, there is a need in the art for additive manufacturing processes capable of making high-density PC parts, which parts at the same time also retain relatively high levels of dimensional stability.

SUMMARY

In meeting the described challenges, the present disclosure first provides compositions, comprising: a population of particulates that comprise an at least partially crystalline polycarbonate, the population of particulates having an average cross-sectional dimension of from about 1 to about 200 µm; the composition having a zero-shear viscosity of less than about $10^4$ Pa·s at the melting temperature of the population particulates; and the at least partially crystalline polycarbonate having a weight-average molecular weight, per polystyrene standards, of from about 17,000 to about 40,000 Daltons.

The present disclosure also provides methods comprising: depositing a first layer of a composition at a work surface; irradiating at least a selected portion of the first layer; depositing at least a second layer of the composition at the selected portion of the first layer so as to fuse together at least some particulate in the selected portion with the second layer, wherein the irradiating the selected portion of the first layer heats at least the selected portion to the melting onset temperature of the composition, and wherein the irradiating is effected such that the composition attains a zero shear viscosity of about $10^4$ Pa·s or less, wherein the composition comprises a partially crystalline polycarbonate particulate and the partially crystalline polycarbonate particulate has an average cross-sectional dimension of from about 1 µm to about 200 µm, has from about 10% crystallinity to about 50% crystallinity, and has a weight-average molecular weight, per polystyrene standards, of from about 17,000 to about 40,000 Daltons.

BRIEF DESCRIPTION OF THE DRAWINGS

The summary, as well as the following detailed description, is further understood when read in conjunction with the appended drawings. For the purpose of illustrating the disclosure, there are shown in the drawings exemplary aspects of the disclosure; however, the disclosure is not limited to the specific methods, compositions, and devices disclosed. In addition, the drawings are not necessarily drawn to scale. In the drawings:

FIG. 4 depicts the viscosity (as a function of temperature) of an exemplary composition according to the present disclosure.

FIG. 5 depicts Table 1 summarizing mechanical properties for (a) an article formed from a partially crystalline polycarbonate composition according to the present disclosure and (b) for an article formed from a conventional polyamide composition.

FIG. 6 depicts parts that have been additively manufactured in the x-, y-, and z-directions.

DETAILED DESCRIPTION OF ILLUSTRATIVE ASPECTS

Figure 1:
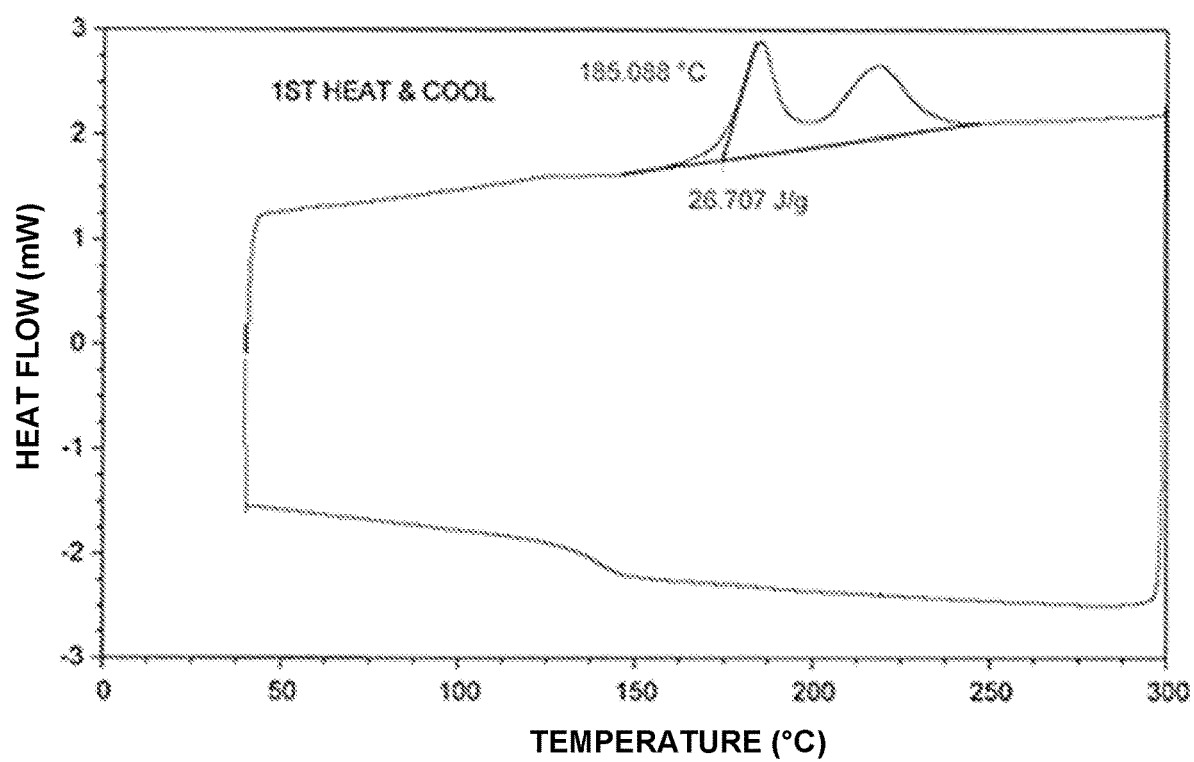
FIG. 1 depicts a differential scanning calorimetry (DSC) thermogram of an at least partially crystalline polycarbonate.

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular aspects by way of example only and is not intended to be limiting of the claimed disclosure.

It is to be appreciated that certain features of the disclosure which are, for clarity, described herein in the context of separate aspects, can also be provided in combination in a single aspect. Conversely, various features of the disclosure that are, for brevity, described in the context of a single aspect, can also be provided separately or in any subcombination. Further, reference to values stated in ranges includes each and every value within that range. Any documents cited herein are incorporated herein by reference in their entireties for any and all purposes.

Terms

It is also to be understood that the terminology used herein is for the purpose of describing particular aspects only and is not intended to be limiting. As used in the specification and in the claims, the term "comprising" may include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein. As used in the specification and the appended claims, the singular forms "a," "an" and "the" include plural referents unless the context clearly dictates otherwise. Thus, for example, reference to "a virgin polycarbonate" includes mixtures of two or more virgin polycarbonates. Furthermore, for example, reference to a filler includes mixtures of fillers.

Ranges can be expressed herein as from one value (first value) to another value (second value). When such a range is expressed, the range includes in some aspects one or both of the first value and the second value. For example, a range of "1 to 10" includes all intermediate values, e.g., 3, 5.56, and 7.3. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated +/−10% a variation unless otherwise indicated or inferred. For example, "about 10" encompasses the range from 9 to 11, including 10. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise. As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

As used herein, the term "effective amount" refers to an amount that is sufficient to achieve the desired modification of a physical property of the composition or material. For example, an "effective amount" of a recycled polycarbonate blend refers to an amount that is sufficient to achieve the desired improvement in the property modulated by the formulation component, e.g. splaying, under applicable test conditions and without adversely affecting other specified properties. The specific level in terms of wt % in a composition required as an effective amount will depend upon a variety of factors including the amount and type of recycled polycarbonate blend, amount and type of virgin polycarbonate polymer compositions, amount and type of impact modifier compositions, including virgin and recycled impact modifiers, and end use of the article made using the composition.

Disclosed are the components useful in preparing the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary.

For example, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent ("wt %") of a component, unless specifically stated to the contrary, is based on the total weight of the formulation or composition in which the component is included. For example if a particular element or component in a composition or article is said to have 8% by weight, it is understood that this percentage is relative to a total compositional percentage of 100% by weight. Molecular weights, where given, are understood to be on a polystyrene basis.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms. The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aralkyl" as used herein is an aryl group having an alkyl, alkynyl, or alkenyl group as defined above attached to the aromatic group. An example of an aralkyl group is a benzyl group. The term "thermoplastic" as used herein is a plastic material—suitably a polymer—that becomes pliable or moldable above a specific temperature and solidifies upon cooling. The term "carbonate group" as used herein is represented by the formula OC(O)OR, where R can be hydrogen, an alkyl, alkenyl, alkynyl, aryl, aralkyl, cycloalkyl, halogenated alkyl, or heterocycloalkyl group described above.

The term "organic residue" defines a carbon-containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

Compositions of the present disclosure may provide plastic compositions suitable for additive manufacturing, particularly as high density polycarbonate parts. For example, the disclosed compositions have a density of within from about 2% to about 4% of the density of an injection-molded article formed from a corresponding amorphous polycarbonate. As a further example, an article according to the present disclosure may have a density that is from about 96% to 98% the density of a corresponding injection-molded article. In various aspects, the present disclosure provides compositions, comprising: a population of particulates that comprise an at least partially crystalline polycarbonate (10% to 50% crystallinity), the population of particulates having an average cross-sectional dimension of from about 1 to about 200 μm; the composition having a zero-shear viscosity of less than about $10^4$ Pascal·seconds (Pa·s) at the melting temperature of the population particulates; and the at least partially crystalline polycarbonate having a weight-average molecular weight, per polystyrene standards, of from about 17,000 to about 40,000 Daltons. The composition exhibits a zero-shear viscosity of less than about $10^4$ Pa·s at the melting temperature of the population of particulates.

The composition comprises a partially crystalline polycarbonate particulate having a D10 particle size of from about 1 μm to about 45 μm; a D50 particle size of from greater than 45 μm to about 80 μm; a D90 particle size of from greater than 80 μm to about 125 μm; an average cross-sectional dimension of from about 1 μm to about 200 μm; and from about 10% crystallinity to about 50% crystallinity, wherein the at least partially crystalline polycarbonate has a weight-average molecular weight, per polystyrene standards, of from about 17,000 to about 40,000 Daltons, and wherein the composition exhibits a zero-shear viscosity of less than about 104 Pa·s at the melting temperature of the partially crystalline polycarbonate.

Polycarbonate

The composition comprises a polycarbonate as described in the present disclosure. Specifically, the population of particulate described herein may comprise an at least partially crystalline polycarbonate. The partially crystalline polycarbonate may have an average particle diameter of less than or equal to 200 μm. In specific examples, the partially crystalline polycarbonate powder may have average particle diameter of about 10 μm to about 150μm.

The crystalline polycarbonate powder has a percent crystallinity of from about 10% to about 50% crystallinity, or 10% to 50% crystallinity. In a specific example, the partially crystalline polycarbonate has a percent crystallinity of 25% or about 25%. Crystallinity, or percent crystallinity, may be determined according to formula (1).

$$X_c(T) = \Delta H_f(T)/\Delta H_f^0(T) \tag{1}$$

wherein, $X_c(T)$ is the percent crystallinity; $\Delta H_f$ is the heat of fusion of a given material; $\Delta H_f^0$ is the heat of fusion of the 100% crystalline form of the material. The values for $\Delta H_f$ may be measured using differential scanning calorimetry while the $\Delta H_f^0$ may be obtained using X-ray diffraction techniques.

As an example, a partially crystalline polycarbonate having a crystallinity of about 25% may exhibit a DSC thermogram as presented in FIG. 1 where a fully crystalline PC has a heat of fusion ($\Delta H_f^0$) of about 109 Joules per gram (J/g) and an observed $\Delta H_f$ of about 27 J/g (DSC measured) ($X_c(T) = \Delta H_f/\Delta H_f^0 = 27/109 = 24.8\%$, or about 25% crystallinity). Heat flow is presented as milliwatts (mW).

Descriptions of the various types of polycarbonates comprising the at least partially crystalline polycarbonate are articulated below, but should not be construed as limiting. Various types of polycarbonates that have a repeating structural background of the following formula can be utilized.

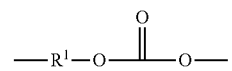

The selection of a polycarbonate backbone of choice depends on many factors such as end use and other factors understood by one of ordinary skill the art.

In one aspect, the polycarbonates have repeating structural carbonate units of the formula (2):

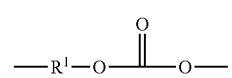

(2)

wherein greater than or equal to 60 percent of the total number of $R^1$ groups contain aromatic organic groups and the balance thereof are aliphatic, alicyclic, or aromatic groups.

In another aspect, the polycarbonate is derived from bisphenol-A.

In another aspect, each $R^1$ group is a divalent aromatic group, for example derived from an aromatic dihydroxy compound of the formula (3):

wherein each of $A^1$ and $A^2$ is a monocyclic divalent arylene group, and Y1 is a single bond or a bridging group having one or two atoms that separate $A^1$ from $A^2$. In an exemplary aspect, one atom separates $A^1$ from $A^2$. In another aspect, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopenta-decylidene, cyclododecylidene, and adamantylidene. The bridging group $Y^1$ can be a hydrocarbon group or a saturated hydrocarbon group such as methylene, cyclohexylidene, or isopropylidene.

Included within the scope of formula (2) are bisphenol compounds of formula (4):

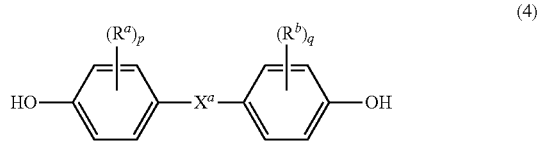

wherein $R^a$ and $R^b$ each represent a halogen atom or a monovalent hydrocarbon group and can be the same or different; p and q are each independently integers of 0 to 4; and $X^a$ represents a single bond or one of the groups of formulas (5) or (6):

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and Re is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl.

In an aspect, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary aspect, $X^a$ is a substituted $C_{3-18}$ cycloalkylidene of formula (7):

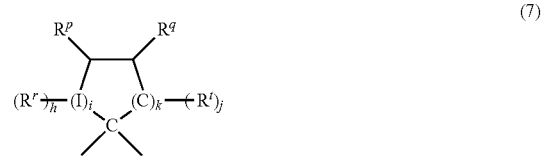

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When k is 1 and i is 0, the ring as shown in formula (6) contains 4 carbon atoms, when k is 2, the ring as shown contains 5 carbon atoms, and when k is 3, the ring contains 6 carbon atoms. In one aspect, two adjacent groups (e.g., $R^q$ and $R^t$ taken together) form an aromatic group, and in another aspect, $R^q$ and $R^t$ taken together form one aromatic group and $R^r$ and $R^p$ taken together form a second aromatic group.

Non-limiting examples of dihydroxy compounds that can provide polycarbonates with glass transition temperature $T_g$ greater than 170° C. include 3,3-bis(4-hydroxyphenyl)-2-phenylisoindolin-1-one (PPPBP), 1,1-bis(4-hydroxyphenyl)-3,3,5-trimethylcyclohexane (Bisphenol TMC), 4,4'-(1-phenylethane-1,1-diyl)diphenol (bisphenol AP) as well as adamantyl-containing aromatic dihydroxy compounds and fluorene-containing aromatic dihydroxy compounds.

Specific example of dihydroxy compounds of formula (3) can be the formula (8):

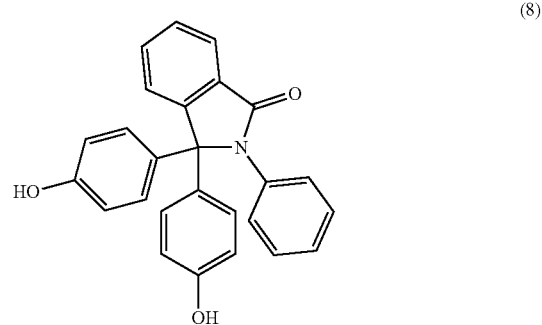 [SMILES: O=C1c2ccccc2C(c2ccc(O)cc2)(c2ccc(O)cc2)N1c1ccccc1]

(also known as 3,3-bis(4-hydroxyphenyl)-2-phenylisoindolin-1-one (PPPBP)) also known as 2-phenyl-3,3-bis(4-hydroxyphenyl)phthalimidine.

Alternatively, the dihydroxy compounds of formula (2) may be the formula (9):

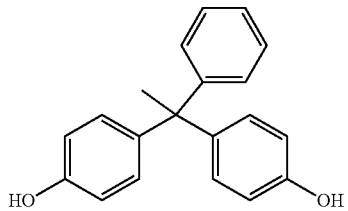

(9)

(also known as 4,4'-(1-phenylethane-1,1-diyl)diphenol (bisphenol AP) also known as 1,1-bis(4-hydroxyphenyl)-1-phenyl-ethane).

Alternatively, the dihydroxy compounds of formula (3) may be the formula (10):

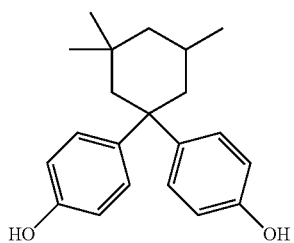

(10)

(bisphenol TMC) also known as 1,1-bis(4-hydroxyphenyl)-3,3,5-trimethylcyclohexane) or 4,4'-(3,3,5-trimethylcyclohexane-1,1-diyl)diphenol. Examples of adamantyl-containing aromatic dihydroxy compounds and fluorene-containing aromatic dihydroxy compounds are set forth in Formulas (A) and (B) respectively.

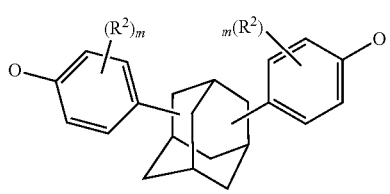

(A)

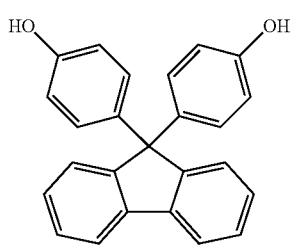

(B)

Another possible polycarbonate with high Tg is set forth in formula (C):

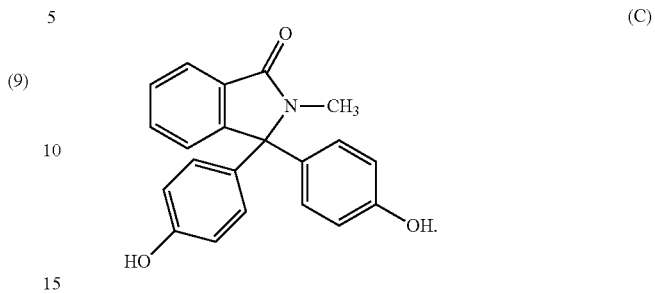

(C)

A polycarbonate can have a bisphenol of formula (D) as a repeating monomer unit therein:

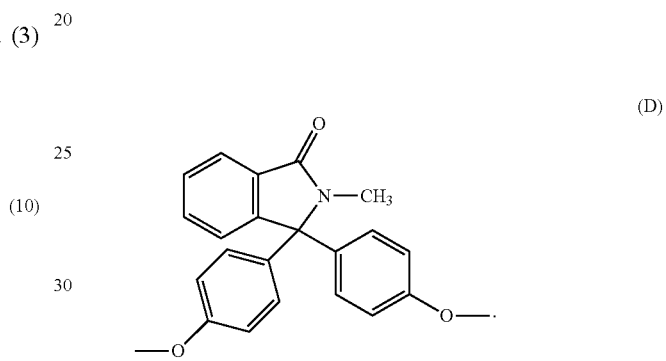

(D)

When k is 3 and i is 0, bisphenols containing substituted or unsubstituted cyclohexane units are used, for example bisphenols of formula (11):

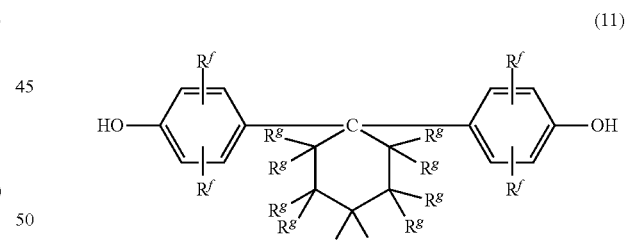

(11)

wherein each $R^f$ is independently hydrogen, $C_{1-12}$ alkyl, or halogen; and each $R^g$ is independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC™ trade name.

Other useful dihydroxy compounds having the formula HO—R$^1$—OH include aromatic dihydroxy compounds of formula (12):

(12)

wherein each R$^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3, 5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that can be represented by formula (2) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used.

"Polycarbonate" as used herein includes homopolycarbonates, copolymers comprising different R$^1$ moieties in the carbonate (also referred to herein as "copolycarbonates"), and copolymers comprising carbonate units and other types of polymer units, such as ester units. In one specific aspect, the polycarbonate is a linear homopolymer or copolymer comprising units derived from bisphenol A, in which each of A$^1$ and A$^2$ is p-phenylene and Y$^1$ is isopropylidene in formula (2). More specifically, greater than or equal to 60%, particularly greater than or equal to 80% of the R$^1$ groups in the polycarbonate are derived from bisphenol A.

Another specific type of copolymer is a polyester carbonate, also known as a polyester-polycarbonate. Such copolymers further contain, in addition to recurring carbonate chain units of the formula (2), repeating units of formula (13):

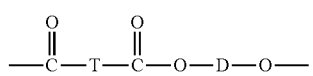

(13)

wherein D is a divalent group derived from a dihydroxy compound, and can be, for example, a $C_2$-$C_{10}$ alkylene group, a $C_6$-$C_{20}$ alicyclic group, a $C_6$-$C_{20}$ aromatic group or a polyoxyalkylene group in which the alkylene groups contain 2 to 6 carbon atoms, specifically 2, 3, or 4 carbon atoms; and T is a divalent group derived from a dicarboxylic acid, and can be, for example, a $C_2$-$C_{10}$ alkylene group, a $C_6$-$C_{20}$ alicyclic group, a $C_6$-$C_{20}$ alkyl aromatic group, or a $C_6$-$C_{20}$ aromatic group. In one aspect, D is a $C_2$ to $C_{30}$ alkylene group having a straight chain, branched chain, or cyclic (including polycyclic) structure. In another aspect, D is derived from an aromatic dihydroxy compound of formula (4) above. In another aspect, D is derived from an aromatic dihydroxy compound of formula (9) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98. In another specific aspect, D is a $C_{2-6}$ alkylene group and T is p-phenylene, m-phenylene, naphthalene, a divalent cycloaliphatic group, or a combination thereof. This class of polyester includes the poly(alkylene terephthalates). The molar ratio of ester units to carbonate units in the copolymers can vary broadly, for example 1:99 to 99:1, specifically 10:90 to 90:10, more specifically 25:75 to 75:25, depending on the desired properties of the final composition.

In a specific aspect, the polyester unit of a polyester-polycarbonate can be derived from the reaction of a combination of isophthalic and terephthalic diacids (or derivatives thereof) with resorcinol. In another specific aspect, the polyester unit of a polyester-polycarbonate is derived from the reaction of a combination of isophthalic acid and terephthalic acid with bisphenol-A. In a specific aspect, the polycarbonate units are derived from bisphenol A. In another specific aspect, the polycarbonate units are derived from resorcinol and bisphenol A in a molar ratio of resorcinol carbonate units to bisphenol A carbonate units of 1:99 to 99:1.

A specific example of a polycarbonate-polyester is a copolycarbonate-polyester-polysiloxane terpolymer comprising carbonate units of formula (2), ester units of formula (10), and polysiloxane (also referred to herein as "polydiorganosiloxane") units of formula (14):

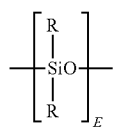

(14)

wherein each occurrence of R is same or different, and is a $C_{1-13}$ monovalent organic group. For example, R may independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups may be fully or partially halogenated with fluorine, chlorine, bromine, or iodine, or a combination thereof. Combinations of the foregoing R groups may be used in the same copolymer. In an aspect, the polysiloxane comprises R groups that have a minimum hydrocarbon content. In a specific aspect, an R group with a minimum hydrocarbon content is a methyl group.

The value of E in formula (14) may vary widely depending on the type and relative amount of each component in the plastic (e.g., thermoplastic) composition, the desired properties of the composition, and like considerations. Herein, E has an average value of 5 to 200, with the specific amount chosen so that a 1.0 millimeter (mm) thick plaque of the plastic composition (i.e., plastic material, coated conversion material(s), any additive(s)) has a transparency (% T) of greater than or equal to 30%. It is readily understood by an artisan that the E value is chosen (e.g., adjusted such as when the amount of siloxane in the material and when the siloxane is introduced to form the material and/or the process for making the material) to achieve a balance between transparency, flame retardancy, and impact. In an aspect, E has an average value of 16 to 50, specifically 20 to 45, and more specifically 25 to 45. In another aspect, E has an average value of 4 to 15, specifically 5 to 15, more specifically 6 to 15, and still more specifically 7 to 12.

In an aspect, polydiorganosiloxane units are derived from dihydroxy aromatic compound of formula (15):

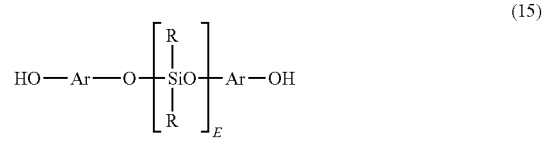

wherein E is as defined above; each R may independently be the same or different, and is as defined above; and each Ar may independently be the same or different, and is a substituted or unsubstituted $C_{6-30}$ arylene group, wherein the bonds are directly connected to an aromatic moiety. Suitable Ar groups in formula (15) may be derived from a $C_{6-30}$ dihydroxy aromatic compound, for example a dihydroxy aromatic compound of formula (3), (4), (8), or (9) above. Combinations comprising at least one of the foregoing dihydroxy aromatic compounds may also be used. Examples of dihydroxy aromatic compounds include resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl) methane, 1,1-bis(4-hydroxyphenyl) ethane, 2,2-bis (4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds may also be used. In an aspect, the dihydroxy aromatic compound is unsubstituted, or is not substituted with non-aromatic hydrocarbon-containing substituents such as, for example, alkyl, alkoxy, or alkylene substituents.

In a specific aspect, where Ar is derived from resorcinol, the polydiorganosiloxane repeating units are derived from dihydroxy aromatic compounds of formula (16):

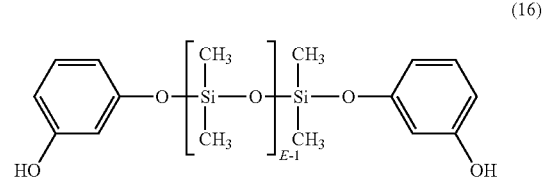

or, where Ar is derived from bisphenol-A, from dihydroxy aromatic compounds of formula (17):

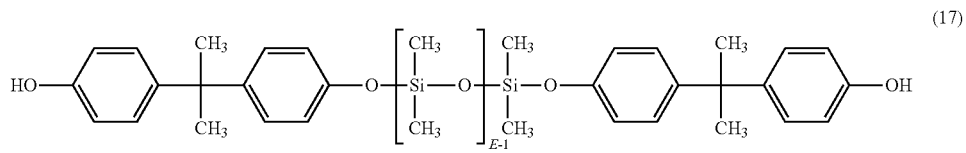

wherein E is as defined above.

In another aspect, polydiorganosiloxane units are derived from dihydroxy aromatic compound of formula (18):

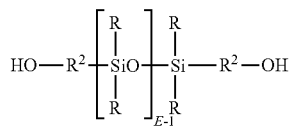

wherein R and E are as described above, and each occurrence of $R^2$ is independently a divalent $C_{1-30}$ alkylene or $C_{7-30}$ arylene-alkylene, and wherein the polymerized polysiloxane unit is the reaction residue of its corresponding dihydroxy aromatic compound. In a specific aspect, where $R^2$ is $C_{7-30}$ arylene-alkylene, the polydiorganosiloxane units are derived from dihydroxy aromatic compound of formula (19):

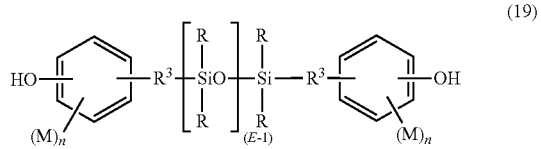

wherein R and E are as defined above. Each $R^3$ is independently a divalent $C_{2-8}$ aliphatic group. Each M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4.

In an aspect, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another aspect, R is methyl, or a combination of methyl and trifluoropropyl, or a combination of methyl and phenyl. In still another aspect, M is methoxy, n is 0 or 1, $R^3$ is a divalent $C_{1-3}$ aliphatic group, and R is methyl.

In a specific aspect, the polydiorganosiloxane units are derived from a dihydroxy aromatic compound of formula (20):

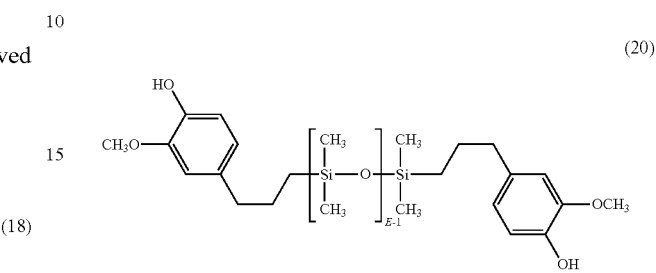

wherein E is as described above.

In another specific aspect, the polydiorganosiloxane units are derived from dihydroxy aromatic compound of formula (21):

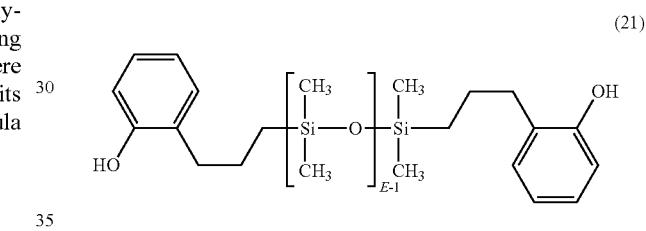

wherein E is as defined above.

Dihydroxy polysiloxanes typically can be made by functionalizing a substituted siloxane oligomer of formula (22):

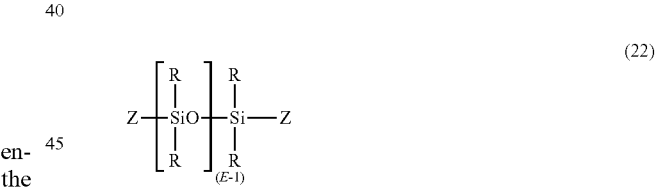

wherein R and E are as previously defined, and Z is H, halogen (Cl, Br, I), or carboxylate. Examples of carboxylates include acetate, formate, benzoate, and the like. In an exemplary aspect, where Z is H, compounds of formula (21) may be prepared by platinum catalyzed addition with an aliphatically unsaturated monohydric phenol. Examples of aliphatically unsaturated monohydric phenols include eugenol, 2-allylphenol, 4-allylphenol, 4-allyl-2-methylphenol, 4-allyl-2-phenylphenol, 4-allyl-2-bromophenol, 4-allyl-2-t-butoxyphenol, 4-phenyl-2-allylphenol, 2-methyl-4-propenylphenol, 2-allyl-4,6-dimethylphenol, 2-allyl-4-bromo-6-methylphenol, 2-allyl-6-methoxy-4-methylphenol, and 2-allyl-4,6-dimethylphenol. Combinations comprising at least one of the foregoing may also be used. Where Z is halogen or carboxylate, functionalization may be accomplished by reaction with a dihydroxy aromatic compound of formulas (3), (4), (8), (9), or a combination comprising at least one of the foregoing dihydroxy aromatic compounds. In an aspect, compounds of formula (13) may be formed from an alpha, omega-bisacetoxypolydiorangonosiloxane and a dihydroxy aromatic compound under phase transfer conditions.

In some aspects a copolycarbonate terpolymer can be used. Specific copolycarbonate terpolymers include those with polycarbonate units of formula (2) wherein $R^1$ is a $C_{6-30}$ arylene group, polysiloxane units derived from siloxane diols of formula (14), (17) or (18), and polyester units wherein T is a $C_{6-30}$ arylene group. In an aspect, T is derived from isophthalic and/or terephthalic acid, or reactive chemical equivalents thereof. In another aspect, $R^1$ is derived from the carbonate reaction product of a resorcinol of formula (9), or a combination of a resorcinol of formula (9) and a bisphenol of formula (5).

The relative amount of each type of unit in the foregoing terpolymer will depend on the desired properties of the terpolymer, and are readily determined by one of ordinary skill in the art without undue experimentation, using the guidelines provided herein. For example, the polycarbonate-polyester-polysiloxane terpolymer can comprise siloxane units in an amount of 0.1 to 25 weight percent (wt %), specifically 0.2 to 10 wt %, more specifically 0.2 to 6 wt %, even more specifically 0.2 to 5 wt %, and still more specifically 0.25 to 2 wt %, based on the total weight of the polycarbonate-polyester-polysiloxane terpolymer, with the proviso that the siloxane units are provided by polysiloxane units covalently bonded in the polymer backbone of the polycarbonate-polyester-polysiloxane terpolymer. The polycarbonate-polyester-polysiloxane terpolymer can further comprise 0.1 to 49.85 wt % carbonate units, 50 to 99.7 wt % ester units, and 0.2 to 6 wt % polysiloxane units, based on the total weight of the polysiloxane units, ester units, and carbonate units. Alternatively, the polycarbonate-polyester-polysiloxane terpolymer comprises 0.25 to 2 wt % polysiloxane units, 60 to 96.75 wt % ester units, and 3.25 to 39.75 wt % carbonate units, based on the total weight of the polysiloxane units, ester units, and carbonate units. The specific amount of terpolymer and the composition of the terpolymer will be chosen so that a 1.0 mm thick plaque of the composition transparency (% T) of greater than or equal to 30%.

Branching Agents

The polycarbonates herein may include branched polycarbonate(s). Various types of branching agents can be utilized for the aspects encompassed by this disclosure. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride (TMTC), tris-p-hydroxy phenyl ethane (THPE), 3,3-bis-(4-hydroxyphenyl)-oxindole (also known as isatin-bis-phenol), tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Mixtures comprising linear polycarbonates and branched polycarbonates can be used.

In some aspects, a particular type of branching agent is used to create branched polycarbonate materials. These branched polycarbonate materials have statistically more than two end groups. The branching agent is added in an amount (relative to the bisphenol monomer) that is sufficient to achieve the desired branching content, that is, more than two end groups. In some aspects, an increase in the amount of the chain termination agent is used in the polymerization. The amount of chain termination agent used when the particular branching agent is used is generally higher than the instance when only a chain termination agent is used. The amount of chain termination agent used is generally above 5 mole percent and less than 20 mole percent compared to the bisphenol monomer.

In some aspects, the branching agent is a structure derived from a triacid trichloride of the formula (23):

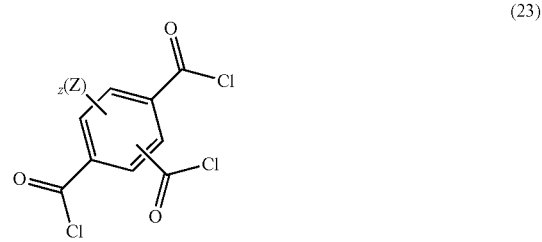

wherein, in this formula (23), Z is hydrogen, a halogen, $C_{1-3}$ alkyl group, $C_{1-3}$ alkoxy group, $C_{7-12}$ arylalkyl, alkylaryl, or nitro group, and z is 0 to 3; or a branching agent derived from a reaction with a tri-substituted phenol of the formula (24):

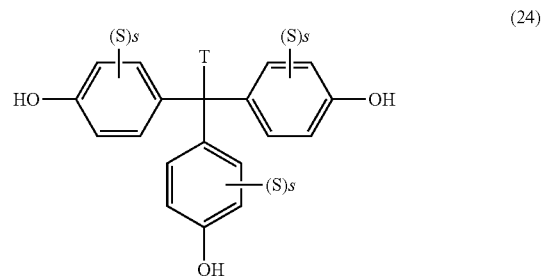

wherein, in this formula (24), T is a $C_{1-20}$ alkyl group, $C_{1-20}$ alkyleneoxy group, $C_{7-12}$ arylalkyl, or alkylaryl group, S is hydrogen, a halogen, $C_{1-3}$ alkyl group, $C_{1-3}$ alkoxy group, $C_{7-12}$ arylalkyl, alkylaryl, or nitro group, s is 0 to 4.

In another aspect, the branching agent is a structure having formula (25):

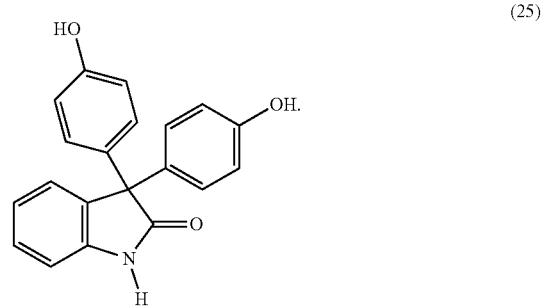 [SMILES: O=C1Nc2ccccc2C1(c1ccc(O)cc1)c1ccc(O)cc1]

Examples of specific branching agents that are particularly effective in the compositions include trimellitic trichloride (TMTC), tris-p-hydroxy phenyl ethane (THPE) and isatin-bis-phenol. In one aspect, in formula (19), Z is hydrogen and z is 3. In another aspect, in formula (25), S is hydrogen, T is methyl, and s is 4.

The relative amount of branching agents used in the manufacture of the polymer will depend on a number of considerations, for example the type of $R^1$ groups, the amount of cyanophenol, and the desired molecular weight of the polycarbonate. In general, the amount of branching agent is effective to provide about 0.1 to 10 branching units per 100 $R^1$ units, specifically about 0.5 to 8 branching units per 100 $R^1$ units, and more specifically about 0.75 to 5 branching units per 100 $R^1$ units. For branching agents having formula (25), the amount of branching agent tri-ester groups are present in an amount of about 0.1 to 10 branching units per 100 $R^1$ units, specifically about 0.5 to 8 branching units per 100 $R^1$ units, and more specifically about 0.75 to 5 tri-ester units per 100 $R^1$ units. For branching agents having formula (21), the amount of branching agent tricarbonate groups are present in an amount of about 0.1 to 10 branching units per 100 $R^1$ units, specifically about 0.5 to 8 branching units per 100 $R^1$ units, and more specifically about 0.75 to 5 triphenylcarbonate units per 100 $R^1$ units. In some aspects, a combination of two or more branching agents may be used.

In one aspect, the polycarbonate of the composition has a branching level of greater than or equal to 1%, or greater than or equal to 2%, or greater than or equal to 3%, or 1% to 3%.

End-Capping Agents

Various types of end-capping agents can be utilized herein provided that such agents do not significantly adversely affect the desired properties of the compositions, such as transparency, ductility, fire retardants, and the like.

Examples of endcapping agents (also referred to as chain stoppers) include certain mono-phenolic compound(s), and/or mono-carboxylic acid chloride(s), and/or mono-chloroformate(s). Mono-phenolic chain stoppers are exemplified by monocyclic phenols such as phenol and $C_1$-$C_{22}$ alkyl-substituted phenols such as p-cumyl-phenol, and p-t-butyl phenol; and monoethers of diphenols, such as p-methoxyphenol, phenols with phenols with cyano-substitution such as p-cyanophenol, or with halogen substitution such as p-fluorophenol, or with nitro-substitution such as 4-nitrophenol. Alkyl-substituted phenols with branched chain alkyl substituents having 8 to 9 carbon atoms can be specifically mentioned. Certain mono-phenolic UV absorbers can also be used as an endcapping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. For example, the polycarbonate can have an end-cap comprising phenol, such as alkyl-substituted phenols, ether-substituted phenols, ester-substituted phenols, cyano-substituted phenols, and halogen substituted phenols, as well as combinations comprising at least one of the foregoing. Optionally, the end-capping agents can be selected from: cyanophenol and a phenol-containing substitution(s) with aliphatic groups, olefinic groups, aromatic groups, halogens, ester groups, ether groups, and combinations comprising at least one of the foregoing.

Of particular usefulness commercially, the end-capping agents can be phenol, e.g., specifically, can be selected from: cyanophenol, para-t-butylphenol, para-cumylphenol, and combinations comprising at least one of the foregoing.

Additional thermoplastic material to which the method may be applied include polymethyl methacrylate (PMMA), polystyrene (PS), cyclic olefinic polymers (COP) and cyclic olefinic copolymers (COC), polyetherimide, and polycarbonate/polyester blends.

Additives

A variety of additives may be present in polycarbonate. For example, one or more fillers may be used, e.g., glass (or other) fibers, titanium dioxide ($TiO_2$), zinc sulfide, or boron nitride. In addition to the thermoplastic polymer resin and fillers, the compositions of the present disclosure can include various additives ordinarily incorporated in resin compositions of this type. Mixtures of additives can be used. Such additives can be mixed at a suitable time during the mixing of the components for forming the composition. The one or more additives are included in the thermoplastic compositions to impart one or more selected characteristics to the thermoplastic compositions and any molded article made therefrom. Examples of additives that can be included in the present disclosure include, but are not limited to, heat stabilizers, process stabilizers, antioxidants, light stabilizers, plasticizers, antistatic agents, mold releasing agents, ultraviolet (UV) absorbers, lubricants, pigments, dyes, colorants, flow promoters, flame retardants, or a combination of one or more of the foregoing additives.

Suitable heat stabilizers include, for example, organo phosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight (pbw) based on 100 parts by weight of the total composition, excluding any filler.

Suitable antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Suitable light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Suitable plasticizers include, for example, phthalic acid esters such as dioctyl-4,5-epoxy-hexahydrophthalate, tris- (octoxycarbonylethyl)isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Suitable antistatic agents include, for example, glycerol monostearate, sodium stearyl sulfonate, sodium dodecylbenzenesulfonate, polyether block amides, which are commercially available from, for example, BASF under the Tradename Irgastat™; from Arkema under the Tradename Pebax™; and from Sanyo Chemical industries under the tradename Pelestat™, or combinations of the foregoing antistatic agents. In one aspect, carbon fibers, carbon nanofibers, carbon nanotubes, carbon black, or any combination of the foregoing can be used in a polymeric resin-containing chemical antistatic agents to render the composition electrostatically dissipative.

Suitable mold releasing agents include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenyl-acryloyl)oxy]methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenyl-acryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight based on 100 parts by weight of the total composition, excluding any filler.

Suitable lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Another optional component is a coloring agent, for example a pigment or a dye, like carbon black, to impart a desired color to an article of manufacture formed from the composition. The coloring agent is not limited, as long as the coloring agent does not adversely affect the composition or an article prepared therefrom, and is sufficiently stable to retain its color under conditions of laser sintering process, ultraviolet laser irradiation, electromagnetic irradiation, and/ or during exposure to the laser. Where a coloring agent is present in the composition, the colorant or pigment may be contained within at least a portion of the polycarbonate particles, or external to the polycarbonate particles, or both.

Suitable pigments include for example, inorganic pigments such as metal oxides and mixed metal oxides such as zinc oxide, titanium dioxides (e.g., $TiO_2$), iron oxides or the like; sulfides such as zinc sulfides, or the like; aluminates; sodium sulfo-silicates; sulfates and chromates; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations including at least one of the foregoing pigments. Pigments are generally used in amounts of from 1 to 10 parts by weight, based on 100 parts by weight based on 100 parts by weight of the total composition, excluding any filler.

Suitable dyes include, for example, organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly (2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethyliminobenzo(a)phenoxazonium perchlorate; 7-amino-4-methylcarbostyryl; 7-amino-4-methylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-diethylamino-4-methylcoumarin; 7-diethylamino-4-trifluoromethylcoumarin; 2,2'-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; nile red; rhodamine 700; oxazine 750; rhodamine 800; Exciton™ IR 125 (infrared reflecting laser dye); Exciton™ IR 144; Exciton™ IR 140; Exciton™ IR 132; Exciton™ IR 26; Exciton™ IRS; diphenylhexatriene; diphenylbutadiene; tetraphenylbutadiene; naphthalene; anthracene; 9,10-diphenylanthracene; pyrene; chrysene; rubrene; coronene; phenanthrene or the like, or combinations including at least one of the foregoing dyes. Dyes are generally used in amounts of from 0.1 to 5 parts by weight, based on 100 parts by weight of the total composition, excluding any filler.

Suitable colorants include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), napthalenetetracarboxylic derivatives, monoazo and disazo pigments, triarylmethanes, aminoketones, bis(styryl)biphenyl derivatives, and the like, as well as combinations including at least one of the foregoing colorants. Colorants are generally used in amounts of from 0.1 to 5 parts by weight, based on 100 parts by weight of the total composition, excluding any filler.

Suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Additionally, materials to improve flow and other properties can be added to the composition, such as low molecular weight hydrocarbon resins or dendritic polyols (such as Boltorn™ from Perstop) or dendritic polyesteramides (such as Hybrane™ from DSM). Particularly useful classes of low molecular weight hydrocarbon resins are those derived from petroleum C5 to C9 feedstock that are derived from unsaturated C5 to C9 monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Examples of flame retardants (FR) include, but are not limited to, halogenated flame retardants, like tretabromo bisphenol A oligomers such as BC58 and BC52, brominated polystyrene or poly(dibromo-styrene), brominated epoxies, decabromodiphenyleneoxide, pentabrombenzyl acrylate monomer, pentabromobenzyl acrylate polymer, ethylene-bis (tetrabromophthalimide, bis(pentabromobenzyl)ethane, metal hydroxides like magnesium hydroxide $Mg(OH)_2$ and aluminum hydroxide $Al(OH)_3$, melamine cyanurate, phosphor based FR systems like red phosphorus, melamine polyphosphate, phosphate esters, metal phosphinates, ammonium polyphosphates, expandable graphites, sodium or potassium perfluorobutane sulfate, sodium or potassium perfluorooctane sulfate, sodium or potassium diphenylsulfone sulfonate and sodium- or potassium-2,4,6-trichlorobenzoate and N-(p-tolylsulfonyl)-p-toluenesulfimide potassium salt, N—(N'-benzylaminocarbonyl) sulfanylimide potassium salt, or a combination containing at least one of the foregoing. Fillers and additives can be added in amounts ranging from about 0.1 to about 40% or even about 50% by weight percent of the total composition.

EXAMPLES

The following are non-limiting, examples of the disclosed technology. These aspects are illustrative only and do not limit the scope of the present disclosure or the claims attached hereto.

Solvent-induced Crystallization: Crystallinity was induced in polycarbonate (PC) particulate (Lexan™ 115, from SABIC) by washing the PC particulate with acetone. (The PC used was ground down to D50 particle size distribution of less than about 125 μm, a D10 of 1 μm to 45 μm, and a D90 of greater than 80 μm to about 125 μm.) The specific technique used was to add a relatively small amount of PC powder to a quantity of acetone while mixing. Following the mixing, the mixture was sieved, the PC powder collected, and the acetone re-used in further experiments. This approach resulted in a fine grain powder useful for additive manufacturing. Experimental details are set forth as follows. Acetone (1.5 liters, 1) was added to a 3 liter glass beaker. PC powder (Lexan™ 115 250 grams) was added while mixing at 3500 revolutions per minute (rpm) with a Silverson™ L5M high speed mixer. The mixture was passed through a 150 micron steel mesh sieve. The powder was collected in a vessel and the acetone re-used. The procedure was repeated until the desired quantity of powder was collected. The powder was air dried and then dried for 12 hours in a 120° C. vacuum oven. The PC powder may be mixed with a flow promoter; the flow promoter may, in some aspects, be present at from about 0.05 to about 1.0 wt %, or from about 0.025 wt % to 0.5 wt %.

Figure 2:
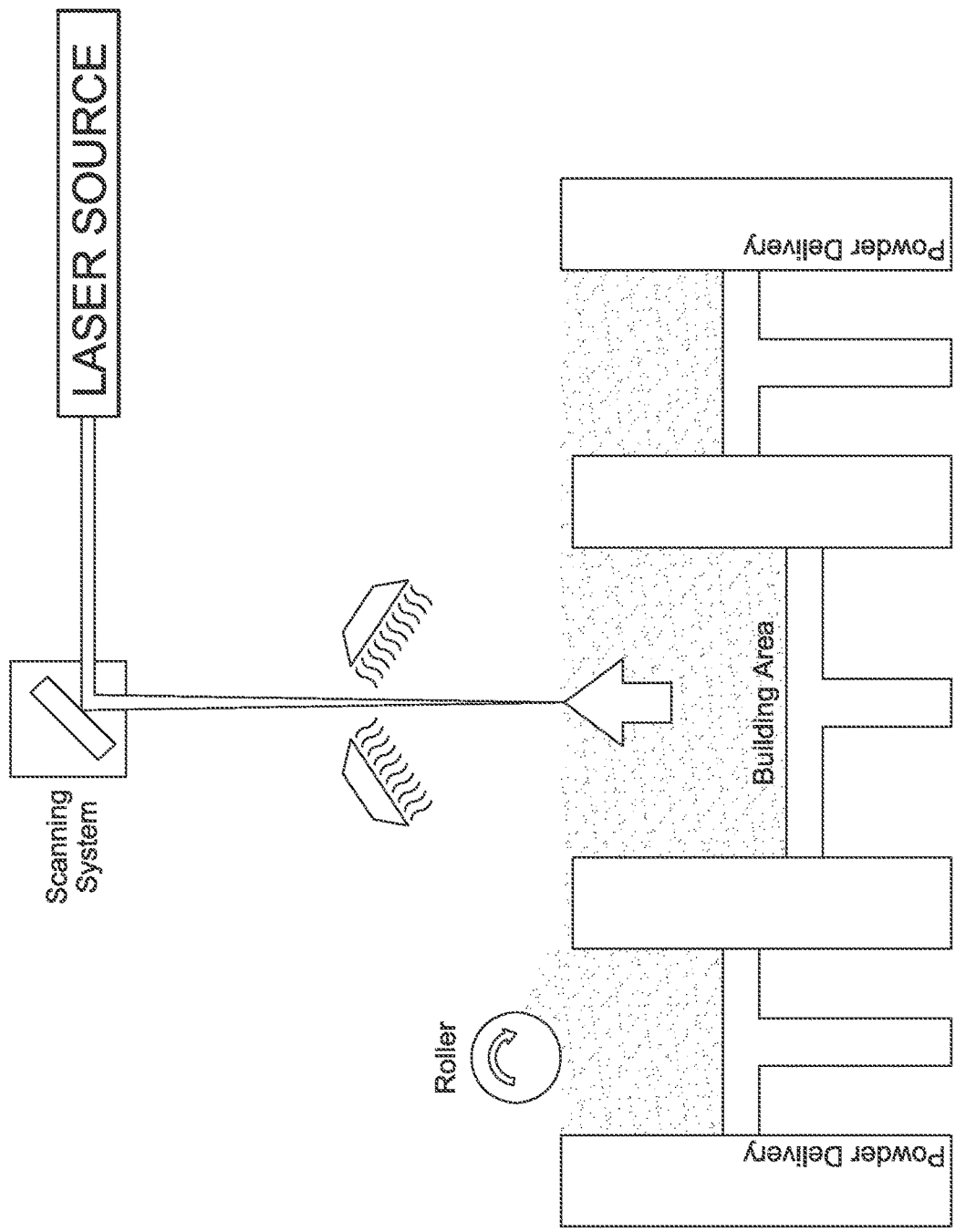
FIG. 2 depicts an exemplary additive manufacturing system.

Selective Laser Sintering: FIG. 2 provides an exemplary system for additive manufacturing, in this instance, selective laser sintering (SLS). (It should be understood that the present disclosure is also applicable to other additive manufacturing techniques besides SLS.) As shown in FIG. 2, a building area is located nearby to one or more powder delivery modules. The building area may be a moveable stage or other platform disposed within a cylinder or other volume. A powder delivery module may likewise comprise a moveable stage or other platform disposed within a cylinder or other volume. In operation, a powder delivery platform is advanced so as to raise up an amount of powder above the top of the cylinder in which the powder delivery platform is disposed. A roller or other modality may then move (e.g., via sweeping or other motion) the powder that was advanced by the platform and then move that powder into the building area.

After powder is moved into the building area, the powder may be illuminated and a region is solidified/sintered as described elsewhere herein. The building area platform is then moved incrementally downward by a set distance (e.g., 100 μm) so as to leave a distance between the uppermost surface of any material disposed on top of the building area platform and the top of the cylinder within which the building area platform is disposed. The roller or other modality then sweeps powder onto the building area so as to fill up the (vertical) distance between the uppermost surface of any material disposed on top of the building area platform and the top of the cylinder within which the building area platform is disposed. A further round of solidification/sintering then takes place.

Infrared sources (or other energy sources) may be used to heat the deposited powder to a temperature that approaches the melting temperature ($T_m$) of the powder. The powder bed (i.e., the powder in the building area) temperature is increased to a temperature which is below (or even just below) the $T_m$ of the powder (for some suitable materials PC, this may be about 155° C.).

A laser source coupled to a scanning system may then illuminate or irradiate particular regions of the deposited powder so as to sinter those regions of the powder to the material beneath. After one layer of powder is sintered, the powder bed piston is lowered with a predetermined increment (e.g., 100 μm), and another layer of powder is spread over the previous sintered layer by a roller. The process then repeats, as the illumination or irradiation source melts and fuses each successive layer to the previous layer until the entire part is completed. The region of powder that remains un-scanned by the laser acts as a natural support for any detached or overhanging features of the product. In this way, a system may be configured to form a three-dimensional (3D) part by way of scheduled application of illumination to specific regions of powder in the building area, thus allowing for layer-by-layer fabrication of 3D parts.

After cooling the building chamber, the parts and the surrounding material, collectively known as the "part cake", are removed. Parts are removed from the part cake and loose powder is either brushed off or bead-blasted. Unfused powder can be sieved and reused for subsequent SLS work.

Figure 3:
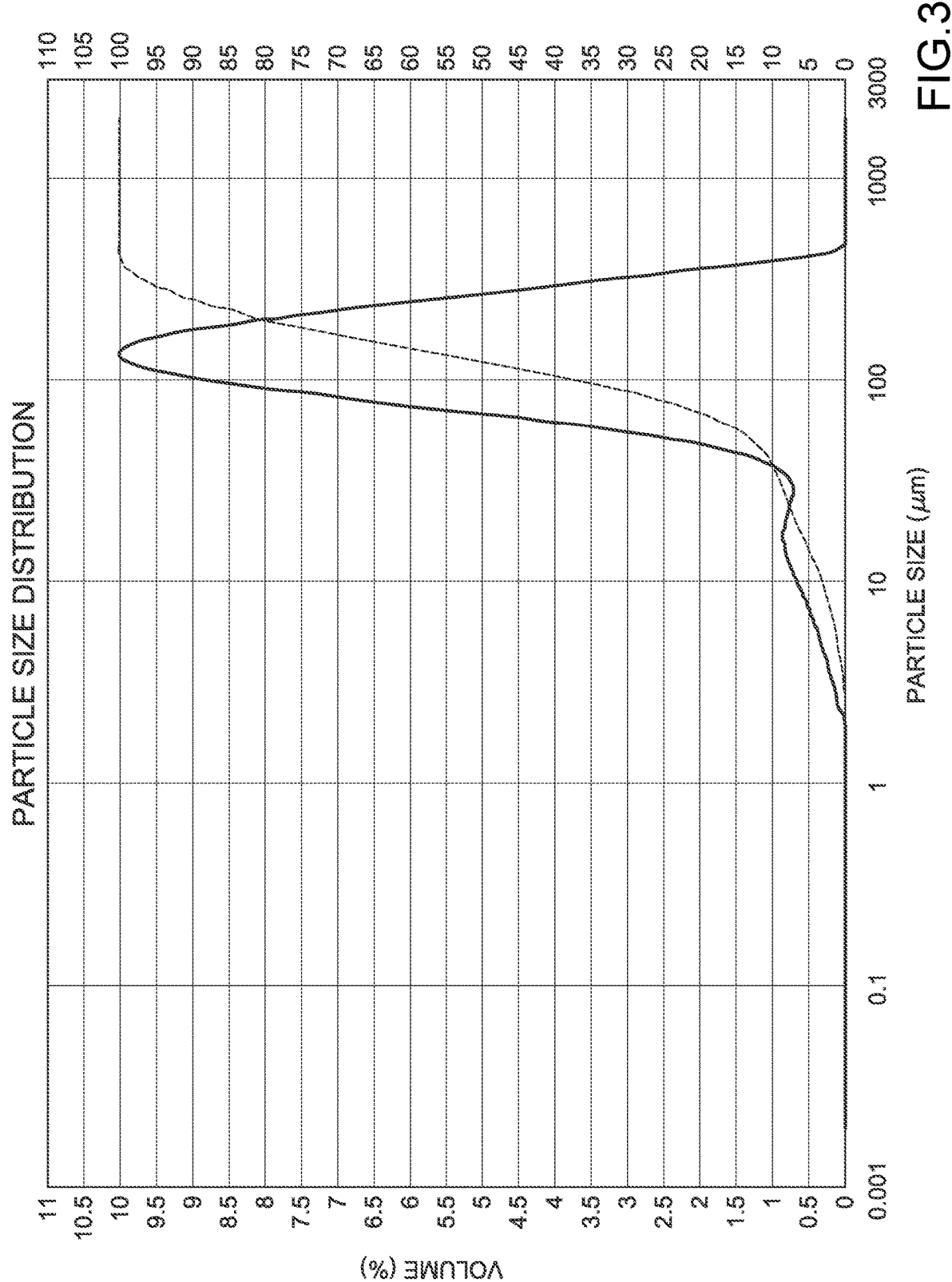
FIG. 3 depicts an exemplary particle size distribution of crystalline PC particulate made according to the present disclosure.

Particle size distribution (PSD): An exemplary PSD is shown in FIG. 3. As shown, the PSD for an exemplary population of PC particles was centered at around 90 μm. For this particular case, regardless of the irregular shape of the particulate, 0.05 wt % flow promoter was sufficient to affect suitable powder flow. The particle size of the ground PC powder was in the range of about 60 to about 90 μm.

Differential Scanning Calorimetry (DSC): After solvent induced crystallization, the polycarbonate powder became crystallized. Solid-melt transitions were measured and visualized with differential scanning calorimetry (DSC). The DSC identified a newly-created $T_m$ in the crystallized material, which Tm is an indication of crystallinity in the powder. The crystalline PC powder further showed a clear melting peak at around 220° C.

Rheology: Without being bound to any particular theory, the zero-shear viscosity for an additive manufacturing powder is preferably around $10^3$ Pa·s or less when the powder is heated by the laser in order to have full coalescence. The viscosity of the polymer should exponentially decrease with increasing the temperature (following Arrhenius law). The following rheology data show excellent melt, meaning very low viscosity that should lead to excellent melt behavior of the powder upon laser sintering and provide very high density parts. As shown in FIG. 4, the disclosed compositions achieve a viscosity that is quite low and even in the range of only about $10^2$ Pa·s at operating conditions.

Mechanical Properties: Using exemplary processing conditions, parts were 3D-printed in the x, y and z directions. The printed PC samples had densities of 98% which density is nearly the same as commercial PA12. The observed melting behavior of the powder was favorable, which resulted in fast and efficient particle coalescence and also in nearly transparent 3D printed parts.

The mechanical properties of the 3D printed PC parts as compared to PA12 in Table 1 (FIG. 5) show excellent properties even better than PA12. In Table 1, density is presented in grams per cubic centimeter ($g/cm^3$). Tensile strength and modulus and flexural strength and modulus are presented in megapascals (MPa). Elongation at break is shown as a percentage. The Charpy notched Izod impact strength is shown in kilojoules per square meter ($KJ/m^2$). One can clearly see that the difference between x, y and z direction for PC 3DP (3D printed) parts is relatively smaller compared to PA12, which indicates good layer to layer adhesion and less anisotropy in the printed parts. (Samples are shown in FIG. 5.) The data suggest that the Tensile strength of PC seems to be twice as much than the PA12 strength indicating higher mechanical load bearing capabilities of the PC parts. The tensile and flexural modulus are also higher as well as the flexural strength of PC when compared to PA12. One can notice, that elongation at break is somewhat lower for PC (5.9% for x, y and 3.6% for z), though in percentage calculated from 1M is higher than PA12. This properties is dependent from the intrinsic property of the material itself and it can be improved probably for other PC types and results in much better outcome. This performance of the PC shows that is possible to laser sinter parts with high density and good dimensional stability that also have good mechanical performance, further demonstrating that PC is a credible alternative to the PA12 materials that are currently prevalent in the field of SLS applications.

Additive Manufacturing: Powder or particulate compositions may be fusible powder compositions, and therefore can be particularly useful in a powder bed fusing process. The term "powder bed fusing" or "powder bed fusion" as used herein refers to processes wherein the powder is selectively sintered or melted and fused, layer-by-layer to provide a three-dimensional article.

Powder bed fusing or powder bed fusion further includes all laser sintering and all selective laser sintering processes as well as other powder bed fusing technologies as defined by ASTM F2792-12a. For example, sintering of the powder composition can be accomplished via application of electromagnetic radiation other than that produced by a laser, with the selectivity of the sintering achieved, for example, through selective application of inhibitors, absorbers, susceptors, or the electromagnetic radiation (e.g., through use of masks or directed laser beams). Any other suitable source of electromagnetic radiation can be used, including, for example, infrared radiation sources, microwave generators, lasers, radiative heaters, lamps, or a combination thereof. In some aspects, selective mask sintering ("SMS") techniques can be used to produce three-dimensional articles of the disclosure. For further discussion of SMS processes, see for example U.S. Pat. No. 6,531,086, the disclosure of which is incorporated herein by this reference in its entirety, which describes an SMS machine in which a shielding mask is used to selectively block infrared radiation, resulting in the selective irradiation of a portion of a powder layer.

In some aspects, the disclosed compositions may include one or more materials that enhance the infrared or other light absorption properties of the composition. Such materials may be termed "Radiation Absorbing Materials" (RAM). RAM may be dark-colored, though this is not a requirement. For example, the composition can include as RAM one or more heat absorbers or even dark-colored materials (e.g., carbon black, carbon nanotubes, or carbon fibers). Dyes are one type of RAM, but the RAM need not be a dye. In some aspects, the RAM and illumination source are selected such that the lambda (2) max for absorption of the RAM (i.e., the maximum wavelength absorbed by the RAM) is within about 50, 45, 40, 35, 30, 25, 20, 15, 10, or even about 5 nanometers (nm) of the illumination emitted from the source. Suitable illumination sources (whether used with RAM-containing materials or materials that are free of RAM) include, e.g., lasers, infrared (IR) (short, medium, and long-wave) sources, and the like.

A RAM may be selected such that the RAM is matched to the illumination source in use such that photons from the illumination source are absorbed by the RAM. The RAM may be present at such a level that there is sufficient RAM to absorb the photons from the illumination source but the RAM does not at the same time substantially affect the mechanical properties of the printed part. A composition may, as discussed, include one or more RAMs.

Exemplary Aspects

In various aspects, the present disclosure pertains to and includes at least the following aspects.

Aspect 1A. A composition, comprising a partially crystalline polycarbonate articulate comprising: A D10 particle size of from about 1 micrometer (μm) to about 45 μm; A D50 particle size of from greater than 45 μm to about 80 μm; A D90 particle size of from greater than 80 μm to about 125 μm; An average cross-sectional dimension of from about 1 μm to about 200 μm; and from about 10% crystallinity to about 50% crystallinity, wherein the at least partially crystalline polycarbonate has a weight-average molecular weight, per polystyrene standards, of from about 17,000 to about 40,000 Daltons, and the composition exhibits a zero-shear viscosity of less than about $10^4$ Pa·s at the melting temperature of the partially crystalline polycarbonate.

Aspect 1B. A composition, comprising a partially crystalline polycarbonate articulate consisting essentially of: A D10 particle size of from about 1 micrometer (μm) to about 45 μm; A D50 particle size of from greater than 45 μm to about 80 μm; A D90 particle size of from greater than 80 μm to about 125 μm; An average cross-sectional dimension of from about 1 μm to about 200 μm; and from about 10% crystallinity to about 50% crystallinity, wherein the at least partially crystalline polycarbonate has a weight-average molecular weight, per polystyrene standards, of from about 17,000 to about 40,000 Daltons, and the composition exhibits a zero-shear viscosity of less than about $10^4$ Pa·s at the melting temperature of the partially crystalline polycarbonate.

Aspect 1C. A composition, comprising a partially crystalline polycarbonate articulate consisting essentially of: A D10 particle size of from about 1 micrometer (μm) to about 45 μm; A D50 particle size of from greater than 45 μm to about 80 μm; A D90 particle size of from greater than 80 μm to about 125 μm; An average cross-sectional dimension of from about 1 μm to about 200 μm; and from about 10% crystallinity to about 50% crystallinity, wherein the at least partially crystalline polycarbonate has a weight-average molecular weight, per polystyrene standards, of from about 17,000 to about 40,000 Daltons, and the composition exhibits a zero-shear viscosity of less than about $10^4$ Pa·s at the melting temperature of the partially crystalline polycarbonate.

Aspect 2A. A composition, comprising: a population of particulates that comprise an at least partially crystalline polycarbonate, the population of particulates having an average cross-sectional dimension of from about 1 to about 200 μm; the composition having a zero-shear viscosity of less than about $10^4$ Pa·s at the melting temperature of the population particulates; and the at least partially crystalline polycarbonate having a weight-average molecular weight, per polystyrene standards, of from about 17,000 to about 40,000 Daltons.

Aspect 2B. A composition, consisting essentially of: a population of particulates that comprise an at least partially crystalline polycarbonate, the population of particulates having an average cross-sectional dimension of from about 1 to about 200 μm; the composition having a zero-shear viscosity of less than about $10^4$ Pa·s at the melting temperature of the population particulates; and the at least partially crystalline polycarbonate having a weight-average molecular weight, per polystyrene standards, of from about 17,000 to about 40,000 Daltons.

Aspect 2C. A composition, consisting of: a population of particulates that comprise an at least partially crystalline polycarbonate, the population of particulates having an average cross-sectional dimension of from about 1 to about 200 μm; the composition having a zero-shear viscosity of less than about $10^4$ Pa·s at the melting temperature of the population particulates; and the at least partially crystalline polycarbonate having a weight-average molecular weight, per polystyrene standards, of from about 17,000 to about 40,000 Daltons.

Aspect 3. The composition of any of aspects 1A-2C, further comprising a flow promoter.

Aspect 4A. A composition, comprising: a population of particulates that comprise at least partially crystalline polycarbonate, the population of particulates having an average cross-sectional dimension of from about 1 to about 200 μm; and a flow promoter in particulate form, the composition having a zero-shear viscosity of less than about $10^4$ Pa·s at the melting temperature of the population particulates.

Aspect 4B. A composition, consisting essentially of: a population of particulates that comprise at least partially crystalline polycarbonate, the population of particulates having an average cross-sectional dimension of from about 1 to about 200 μm; and a flow promoter in particulate form, the composition having a zero-shear viscosity of less than about $10^4$ Pa·s at the melting temperature of the population particulates.

Aspect 4C. A composition, consisting of: a population of particulates that comprise at least partially crystalline polycarbonate, the population of particulates having an average cross-sectional dimension of from about 1 to about 200 μm; and a flow promoter in particulate form, the composition having a zero-shear viscosity of less than about $10^4$ Pa·s at the melting temperature of the population particulates.

Aspect 5. The composition of any of aspects 4A-4C, wherein the at least partially crystalline polycarbonate has a weight-average molecular weight, per polystyrene standards, of from about 17,000 to about 40,000 Daltons.

Aspect 6. The composition of any of aspects 4A-4C, wherein the particulates have a D50 of less than or equal to 125 μm.

Aspect 7. The composition of any of aspects 3-4C, wherein the flow promoter is present at from about 0.025 wt % to about 0.5 wt % as measured against the weight of the composition Aspect 8. The composition of any of aspects 3-4C, wherein the flow promoter comprises silica, alumina, or any combination thereof.

Aspect 9. The composition of any of aspects 2A-8, wherein the at least partially crystalline polycarbonate comprises from about 10% to about 50% crystallinity based on the observed enthalpy of fusion as measured in DSC and/or by X-Ray diffraction.

Aspect 10. The composition of any of aspects 2-9, wherein the population of particulates have a D10 of up to 45 μm.

Aspect 11. The composition of any of aspects 2-10, wherein the population of particulates have a D50 of greater than 45 μm to about 80 μm.

Aspect 12. The composition of any of aspects 2-11, wherein the population of particulates have D90 of greater than 80 μm to about 125 μm.

Aspect 13. The composition of any of aspects 1A-12, further comprising a radiation absorbing material having a λ max of absorption of from about 200 to about 2500 nm.

Aspect 14. The composition of any of aspects 1A-13, further comprising a colorant or pigment wherein the colorant or pigment is contained within at least a portion of the population of particulate or polycarbonate particles, external to the population of particulate or polycarbonate particles, or both.

Aspect 15. A powder for selective laser sintering comprising the composition of any claims 1-14.

Aspect 16. A method, comprising: depositing a first layer of a composition according to any of aspects 1-14 at a work surface; irradiating at least a selected portion of the first layer; depositing at least a second layer of the composition at the selected portion of the first layer so as to fuse together at least some of the particulates in the selected portion with the second layer, wherein the irradiating the selected portion of the first layer heats at least the selected portion to the melting onset temperature of the composition, and wherein the irradiating is effected such that the composition attains a zero shear viscosity of about $10^4$ Pa·s or less.

Aspect 17. The method of aspect 16, wherein the irradiating is effected by a laser sintering process.

Aspect 18. The method of aspect 16, wherein the irradiating is effected by electromagnetic infrared radiation in the presence of an infrared absorber.

Aspect 19. The method of any of aspects 16-17, wherein the composition further comprises a radiation absorbing material having a λ max for absorption of from about 200 to about 2500 nm.

Aspect 20. An additively-manufactured article manufactured according to the method of any of aspects 16-19.

Aspect 21. The additively-manufactured article of aspect 19, wherein the article is additively manufactured in the z-direction, and wherein at least one of the article's tensile strength, tensile modulus, elongation at break, flexural strength, flexural modulus, or Charpy notched Izod impact characteristics, as measured in the z-direction, is within 50% of the corresponding characteristic in a corresponding article additively-manufactured in the x or y direction.

Aspect 22. An article formed from the composition of any one of aspects 1A-14, wherein the article has a density of within from about 2% to about 4% the density of an injection-molded article formed from a corresponding amorphous polycarbonate Aspect 23A. A method of forming a particulate composition, comprising: mixing a population of particulates that comprise at least partially crystalline polycarbonate with a flow promoter to so as to give rise to the particulate composition, the population of particulates comprising at least partially crystalline polycarbonate having an average cross-sectional dimension of from about 1 to about 200 μm.

Aspect 23B. A method of forming a particulate composition, consisting essentially of: mixing a population of particulates that comprise at least partially crystalline polycarbonate with a flow promoter to so as to give rise to the particulate composition, the population of particulates comprising at least partially crystalline polycarbonate having an average cross-sectional dimension of from about 1 to about 200 μm.

Aspect 23C. A method of forming a particulate composition, consisting of: mixing a population of particulates that comprise at least partially crystalline polycarbonate with a flow promoter to so as to give rise to the particulate composition, the population of particulates comprising at least partially crystalline polycarbonate having an average cross-sectional dimension of from about 1 to about 200 μm.

Aspect 24. The method of any of aspects 23A-23C, wherein the population of particulates has a D50 of less than or equal to 125 μm.

Aspect 25. The method of any of aspects 23A-24, wherein the at least partially crystalline polycarbonate has a weight-average molecular weight, per polystyrene standards, of from about 17,000 to about 40,000 Daltons.

Aspect 26. The method of any of aspects 23A-25, wherein the composition further comprises a radiation absorbing material having a λ max of absorption of from about 200 to about 2500 nm.

Aspect 27. The method of any of aspects 23A-26, wherein the at least partially crystalline polycarbonate particulate comprises a copolymer.

Aspect 28. The method of any of aspects 23A-27, wherein the flow promoter comprises silica, alumina, or any combination thereof.

In one aspect, the present disclosure provides compositions comprising a population of particulates that comprise at least partially crystalline polycarbonate, the population of particulates having an average cross-sectional dimension in the range of from about 1 to about 200 μm; and a flow promoter in particulate form, the composition having a zero-shear viscosity of less than about $10^4$ Pa·s at the melting temperature of the population particulates.

The flow promoter may be present at from about 0.025 to about 0.5 wt % as measured against the weight of the composition. As some examples, the flow promoter may be present at, from 0.05 wt % to 0.5 wt % or from about 0.05 wt % to about 0.5 wt %, from 0.3 wt % to 0.5 wt % or from about 0.3 wt % to about 0.5 wt %, or even 0.4 wt % or about 0.4 wt %.

Suitable flow promoters may be in particulate form and include, e.g., metal oxides, mixed metal oxides, or a combination thereof. In some aspects, the flow promoter comprises fumed silica, fumed aluminum oxide, a hydrated silica, amorphous alumina, a glassy silica, a glassy phosphate, a glassy borate, a glassy oxide, titania, talc, mica, a fumed silica, kaolin, attapulgite, calcium silicate, alumina, magnesium silicate, or a combination comprising at least one of the foregoing. Silica and/or alumina flow promoters are suitable; fumed silica is considered especially suitable. In some aspects, a flow promoter particulate may have an average cross-sectional dimension (e.g., diameter) of from about 5 to about 50 nm, e.g., from about 8 to about 15 nm. In a specific example, the flow promoter may comprise a fumed silica such as 2-Propenoic acid, 2-methyl-, 3-(trimethoxysilyl)propylester commercially available as Aerosil™ R 7200 from Evonik.

The disclosed compositions may also include one or more RAMs. (RAM is described in additional detail elsewhere herein.) A RAM may have a λ max of from about 200 to about 2500 nm, e.g., from about 300 to about 2400, from about 400 to about 2000, from about 500 to about 1500, from about 600 to about 1200, from about 800 to about 1100, or even at around 1100 nm. A RAM may be selected such that the RAM has a λ max in the visible light range (e.g., from about 380 to about 800 nm and all intermediate values), in the IR-A short wave range (e.g., from about 800 nm to about 1400 nm and all intermediate values), in the IR-B medium wave range (e.g., from about 1400 to about 3000 nm and all intermediate values). In some aspects, the RAM may have a λ max in the IR-C long wave range (e.g., from about 3000 nm to about 10000 nm and all intermediate values).

A RAM may be present at, e.g., from about 0.0001 to about 1 wt % (e.g., from about 0.001 to about 0.1 wt %) of the composition. A RAM may have a λ max (i.e., the maximum wavelength absorbed by the RAM) of from, e.g., 300 to about 1000 nm, from about 350 to about 950 nm, from about 400 to about 900 nm, from about 450 to about 850 nm, from about 400 to about 800 nm, from about 450 nm to about 750 nm, from about 500 nm to about 700 nm, from about 550 nm to about 650 nm, or even about 600 nm. Exemplary, non-limiting RAMs include dyes, e.g., Disperse Black 9™ (λ max of 461 nm), Disperse Orange™ (λ max of 457 nm), and the like.

The at least partially crystalline polycarbonate may have a weight-average molecular weight, per polystyrene standards, of from about 17,000 to about 40,000 Daltons, e.g., from about 18,000 to about 39,000 Daltons, or from about 19,000 to about 38,000 Daltons, or from about 20,000 to about 37,000 Daltons, or from about 21,000 to about 36,000 Daltons, or from about 22,000 to about 35,000 Daltons, or from about 23,000 to about 34,000 Daltons, or from about 24,000 to about 35,000 Daltons, or from about 25,000 to about 34,000 Daltons, or from about 26,000 to about 33,000 Daltons, or from about 27,000 to about 32,000 Daltons, or from about 28,000 to about 31,000 Daltons, or from about 39,000 to about 30,000 Daltons, and all intermediate values.

The particulates of the disclosed compositions may have a D50 of, e.g., less than or equal to 125 µm. The particulates may also have D50 values of, e.g., from about 25 to about 125 µm, from about 30 to about 120 µm, from about 35 to about 115 µm, from about 40 to about 110 µm, from about 45 to about 105 µm, from about 50 to about 100 µm, from about 55 to about 95 µm, from about 60 to about 100 µm, from about 65 to about 95 µm, from about 70 to about 90 µm, from about 75 to about 85 µm, or even about 80 µm, and all intermediate values.

Also provided are methods. A method comprises: depositing a first layer of a composition according to the present disclosure at a working area; irradiating at least a selected portion of the first layer; depositing at least a second layer of the composition at the selected portion of the first layer so as to fuse together at least some of the particulates in the selected portion with the second layer, wherein the irradiating the selected portion of the first layer heats at least the selected portion to the melting onset temperature of the composition, and wherein the irradiating is effected such that the composition attains a zero shear viscosity of about $10^4$ Pa·s or less.

More specifically, the methods comprise placing or depositing a first layer of a composition according to the present disclosure at a working area, wherein the composition is in powder or particulate form; heating the working area to the melting onset temperature of the composition in particulate form and irradiating at least a selected portion of the first layer. The irradiating the selected portion of the first layer heats at least the selected portion to a temperature above the melting temperature of the composition in particulate form so as to fuse together at least some of the particulate. At least a second layer of the composition in particulate form is deposited at the first layer in the working area and the working area is heated to the melting onset temperature of the composition in particulate form. At least a second selected portion of the second layer is irradiated so as to fuse together at least some of the particulates in the second selected portion with the first layer. The foregoing irradiating steps are effected such that the composition attains a zero shear viscosity of about $10^4$ Pa·s or less. For example, an article or part may be formed by depositing a layer of powdered composition from a feed area to working area. The deposited layer of powder may be heated, for example by infrared heaters to the onset of melting of the powder. A selected portion of the working area may be heated or irradiated (e.g., by laser) to a temperature above the melting temperature so as to fuse the powders into a dense part. This temperature is such that the viscosity is below $10^4$ Pa·s. The steps of depositing, heating/irradiating are repeated for subsequent layers until the desired part is complete.

Illumination or irradiation may be supplied by a variety of sources. Irradiating may be achieved via a suitable source of electromagnetic radiation. For example, irradiating may be achieved by a source of infrared (near or far) light, ultraviolet light, and the like. Where electromagnetic infrared irradiation is used an infrared absorber may be present. Lasers are considered particularly suitable. As described elsewhere herein, a user may employ a mask or other shielding to screen a part of a composition from the irradiating.

As described above, the selected portion of the composition may be heated to a temperature above the $T_m$ of the composition, but also below (e.g., 10° C. below) the degradation temperature of the composition. Particulate that is in the powder delivery (i.e., reservoir) region and has not been delivered to the selected portion may be heated (e.g., via infrared heating) to a temperature at which the particulate remains solid and has not melted or softened. Put another way, such particulate may be at a temperature that is at or below the melting onset temperature of the particulate. Melting onset temperature may refer to a temperature just before a given material begins to melt. A melting onset temperature may be determined using DSC data.

Irradiating of a selected portion of the composition may be effected such that the composition attains a viscosity of about $10^4$ Pa·s or less. The irradiating may be effected such that the composition attains a viscosity in the range of from about $10^4$ Pa·s to about $10^2$ Pa·s, e.g., about $10^3$ Pa·s.

The present disclosure also provides additively-manufactured articles, which articles may be manufactured according to the methods disclosed herein. Additively-manufactured articles according to the present disclosure may have a density of within from about 2% to about 4% the density of an injection-molded article formed from a corresponding amorphous polycarbonate. As one example, an article according to the present disclosure may have a density that is from about 96% to 98% the density of a corresponding injection-molded article.

For articles according to the present disclosure, when the article is additively manufactured in the z-direction, and at least one of the article's tensile strength, tensile modulus, elongation at break, flexural strength, flexural modulus, or Charpy notched Izod impact characteristics, as measured in the z-direction, may be within 50% of the corresponding characteristic in a corresponding article additively-manufactured in the x or y direction.

Also provided are methods of forming a particulate composition. The methods include mixing a population of particulates that comprise at least partially crystalline polycarbonate with a flow promoter to so as to give rise to the particulate composition, the population of particulates comprising at least partially crystalline polycarbonate having an average cross-sectional dimension in the range of from about 1 to about 200 µm.

The methods may also include selecting the particulates according to size before or after mixing the particulates with the flow promoter. As described elsewhere herein, the user may crystallize the particulates; the user may also utilize previously-crystallized particulates.

In specific examples, the particulate may have a narrow particle size volume distribution that is within a range calculated via formula (25).

$$\text{Particle size distribution} = (D90 - D10)/D50 \qquad (25)$$

where D represents the diameter of particles, D50 is a cumulative 50% point of diameter (or 50% pass particle or the value of the particle diameter at 50% in the cumulative distribution); D10 means a cumulative 10% point of diameter; and D90 is a cumulative 90% point of diameter; D50 is also called average particle size or median diameter. Thus, D50 may refer to the particle diameter of the powder/particulate where 50 wt % of the particles in the total distribution of the referenced sample have the noted particle diameter or smaller. Similarly, a D90 refers to the particle diameter of the powder where 90 wt % of the particles in the total distribution of the referenced sample have the noted particle diameter or smaller. Finally, a D10 may refer to particle diameter where 10 wt % of the particles in the total distribution of the referenced sample have the noted particulate diameter or smaller.

A population of particulates, or the at least partially crystalline polycarbonate particulate/powder) may have a D10 of up to 45 μm. The particulates may also have D10 values of, e.g., from about 10 to about 45 μm, or from about 30 to about 45 μm, and all intermediate values. For example, the particulate may have a D10 of about 40 μm. may have a D50 of less than or equal to 125 μm. The particulates may also have D50 values of, e.g., from about 25 to about 125 μm, from about 30 to about 120 μm, from about 35 to about 115 μm, from about 40 to about 110 μm, from about 45 to about 105 μm, from about 50 to about 100 μm, from about 55 to about 95 μm, from about 60 to about 100 μm, from about 65 to about 95 μm, from about 70 to about 90 μm, from about 75 to about 85 μm, or even about 80 μm, and all intermediate values.

The at least partially crystalline polycarbonate particulate/powder may have a D90 of greater than 80 μm to about 125 μm. The particulates may also have D90 values of, e.g., from about 80 to about 120 μm, from about 80 to about 110 μm, or from about 80 to about 100 μm. For example, the particulate may have a D90 of about 90 μm.

The at least partially crystalline polycarbonate particulate/powder may have a D50 of less than or equal to 125 μm. The particulates may also have D50 values of, e.g., from about 25 to about 125 μm, from about 30 to about 120 μm, from about 35 to about 115 μm, from about 40 to about 110 μm, from about 45 to about 105 μm, from about 50 to about 100 μm, from about 55 to about 95 μm, from about 60 to about 100 μm, from about 65 to about 95 μm, from about 70 to about 90 μm, from about 75 to about 85 μm, or even about 80 μm, and all intermediate values.

Particle size distribution or particle size distribution may be measured using a number of known methods. In an example, particle size or particle size distribution may be using laser diffraction methods. Instrumentation may include a Malvern instrument (Mastersizer 2000 laser particle size analyzer. The Malvern Mastersizer 2000 is a suitable instrument and was used in the present disclosure.

The at least partially crystalline polycarbonate may have a weight-average molecular weight, per polystyrene standards, of from about 17,000 to about 40,000 Daltons, e.g., from about 18,000 to about 39,000 Daltons (e.g., from about 18,000 to about 30,000 Daltons), or from about 19,000 to about 38,000 Daltons, or from about 20,000 to about 37,000 Daltons, or from about 21,000 to about 36,000 Daltons, or from about 22,000 to about 35,000 Daltons, or from about 23,000 to about 34,000 Daltons, or from about 24,000 to about 35,000 Daltons, or from about 25,000 to about 34,000 Daltons, or from about 26,000 to about 33,000 Daltons, or from about 27,000 to about 32,000 Daltons, or from about 28,000 to about 31,000 Daltons, or from about 39,000 to about 30,000 Daltons, and all intermediate values. It should be understood that the polycarbonate particulate may be formed from neat polycarbonate, but this is not a requirement, as the polycarbonate particulate may comprise a polycarbonate copolymer or even mixtures of polycarbonate with other polymer. Some illustrative polycarbonates include, e.g., PC115 (SABIC), PC105 (SABIC), PC105B (SABIC), EXL (SABIC), XHT (SABIC), SLX (SABIC), FST (SABIC), and HFD (SABIC). It should be understood that the foregoing listing is exemplary only and does not limit the scope of the present disclosure.

In the disclosed methods, the compositions may also include a RAM having a λ max of from about 200 to about 2500 nm. Suitable RAMs are described elsewhere herein, as are suitable flow promoters.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed:

1. A composition, comprising:
   a. a population of particulates that comprise an at least partially crystalline polycarbonate,
   b. the population of particulates having an average cross-sectional dimension of from about 1 to about 200 μm;
   c. the composition having a zero-shear viscosity of less than about $10^4$ Pas at the melting temperature of the population particulates; and
   d. the at least partially crystalline polycarbonate having a weight-average molecular weight, per polystyrene standards, of from about 17,000 to about 40,000 Daltons.

2. The composition of claim 1, further comprising a flow promoter.

3. The composition of claim 2, wherein the flow promoter is present at from about 0.025 wt % to about 0.5 wt % as measured against the weight of the composition.

4. The composition of claim 2, wherein the flow promoter comprises silica, alumina, or any combination thereof.

5. The composition of claim 1, wherein the average cross-sectional dimension is from about 10 μm to about 150 μm.

6. The composition of claim 1, wherein the at least partially crystalline polycarbonate comprises from about 10% to about 50% crystallinity based on an observed enthalpy of fusion as measured in DSC and/or by X-Ray diffraction.

7. The composition of claim 1, wherein the population of particulates have a D10 of up to 45 μm.

8. The composition of claim 1, wherein the population of particulates have a D50 of greater than 45 μm to about 80 μm.

9. The composition of claim 1, wherein the population of particulates have D90 of greater than 80 μm to about 125 μm.

10. The composition of claim 1, further comprising a radiation absorbing material having a λ max for absorption of from about 200 to about 2500 nm.

11. The composition of claim 1, further comprising a colorant or pigment wherein the colorant or pigment is contained within the at least a portion of the polycarbonate particles, external to the polycarbonate particles or both.

12. A powder for selective laser sintering comprising the composition of claim 1.

13. A method, comprising:
 a. depositing a first layer of a composition according to claim 1 at a working area;
 b. irradiating at least a selected portion of the first layer;
 c. depositing at least a second layer of the composition at the selected portion of the first layer so as to fuse together at least some of the particulates in the selected portion with the second layer,
 wherein the irradiating the selected portion of the first layer heats at least the selected portion to the melting onset temperature of the composition, and
 wherein the irradiating is effected such that the composition attains a zero shear viscosity of about $10^4$ Pa·s or less.

14. The method of claim 13, wherein the irradiating is effected by a laser sintering process or by electromagnetic radiation in the presence of an infrared absorber.

15. The method of claim 13, wherein the composition further comprises a radiation absorbing material having a λ max of from about 200 to about 2500 nm.

16. An additively-manufactured article manufactured according to the method of claim 13.

17. The additively-manufactured article of claim 16, wherein the article is additively manufactured in the z-direction, and wherein at least one of the article's tensile strength, tensile modulus, elongation at break, flexural strength, flexural modulus, or Charpy notched Izod impact characteristics, as measured in the z-direction, is within 50% of the corresponding characteristic in a corresponding article additively-manufactured in the x or y direction.

18. An article formed from the composition of claim 1, wherein the article has a density of within from about 2% to about 4% the density of an injection-molded article formed from a corresponding amorphous polycarbonate.

* * * * *